(12) United States Patent
Thompson et al.

(10) Patent No.: US 7,348,094 B2
(45) Date of Patent: Mar. 25, 2008

(54) ENHANCED FLOWFIELD PLATES

(75) Inventors: Eric L. Thompson, Honeoye Falls, NY (US); Steven G. Goebel, Victor, NY (US); Scott Ofslager, Albion, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 93 days.

(21) Appl. No.: 11/232,712

(22) Filed: Sep. 22, 2005

(65) Prior Publication Data

US 2006/0127742 A1 Jun. 15, 2006

Related U.S. Application Data

(63) Continuation-in-part of application No. 11/009,378, filed on Dec. 10, 2004.

(51) Int. Cl.
*H01M 8/04* (2006.01)

(52) U.S. Cl. .............................. 429/39; 429/26; 429/38

(58) Field of Classification Search ...................... None
See application file for complete search history.

(56) References Cited

U.S. PATENT DOCUMENTS

| | | | |
|---|---|---|---|
| 5,482,680 A | 1/1996 | Wilkinson et al. | |
| 5,527,363 A | 6/1996 | Wilkinson et al. | |
| 5,547,776 A | 8/1996 | Fletcher et al. | |
| 5,789,094 A | 8/1998 | Kusunoki et al. | |
| 5,804,326 A | 9/1998 | Chow et al. | |
| 6,080,502 A | 6/2000 | Nölscher et al. | |
| 6,309,773 B1 | 10/2001 | Rock | |
| 6,322,919 B1* | 11/2001 | Yang et al. | 429/34 |
| 6,358,642 B1 | 3/2002 | Griffith et al. | |
| 6,413,664 B1 | 7/2002 | Wilkinson et al. | |
| 6,827,747 B2 | 12/2004 | Lisi et al. | |
| 6,844,101 B2 | 1/2005 | Lee et al. | |
| 6,887,610 B2 | 5/2005 | Elhamid et al. | |
| 2003/0129473 A1* | 7/2003 | Lee et al. | 429/35 |
| 2004/0053100 A1 | 3/2004 | Stanley et al. | |
| 2004/0265675 A1* | 12/2004 | Woodcock et al. | 429/38 |
| 2005/0058864 A1 | 3/2005 | Goebel | |
| 2006/0199055 A1* | 9/2006 | Barbir et al. | 429/26 |

OTHER PUBLICATIONS

International Search Report PCT/US05/43140 dated Mar. 7, 2007 corresponding to this application.

* cited by examiner

*Primary Examiner*—Jonathan Crepeau
*Assistant Examiner*—Robert Hodge

(57) ABSTRACT

The present invention is directed to mitigating overuse of limited membrane regions in electrochemical conversion assemblies, particularly under cold start conditions. In accordance with one embodiment of the present invention, the anode and/or cathode flowfield plates of an electrochemical conversion assembly are configured such that the fluid header region defines an anode fluid header, a cathode fluid header, and a coolant fluid header configured such that a feed region of the plate defines an array of substantially linear fluid channels extending from an acutely angled header/feed interface defined on the plate to a feed/active interface defined across the entire active area of the plate.

18 Claims, 2 Drawing Sheets

ENHANCED FLOWFIELD PLATES

CROSS-REFERENCE TO RELATED APPLICATIONS

This application is a continuation-in-part of U.S. patent application Ser. No. 11/009,378, for REACTANT FEED FOR NESTED STAMPED PLATES FOR A COMPACT FUEL CELL, filed Dec. 10, 2004.

BACKGROUND OF THE INVENTION

The present invention relates to electrochemical conversion cells, commonly referred to as fuel cells, which produce electrical energy by processing first and second reactants. For example, electrical energy can be generated in a fuel cell through the reduction of an oxygen-containing gas and the oxidation of a hydrogenous gas. By way of illustration and not limitation, a typical cell comprises a membrane electrode assembly positioned between a pair of flow fields accommodating respective ones of the reactants. More specifically, a cathode flowfield plate and an anode flowfield plate can be positioned on opposite sides of the membrane electrode assembly. The voltage provided by a single cell unit is typically too small for useful application so it is common to arrange a plurality of cells in a conductively coupled "stack" to increase the electrical output of the electrochemical conversion assembly.

By way of background, the conversion assembly generally comprises a membrane electrode assembly, an anode flowfield, and a cathode flowfield. The membrane electrode assembly in turn comprises a proton exchange membrane separating an anode and cathode. The membrane electrode assembly generally comprises, among other things, a catalyst supported by a high surface area support material and is characterized by enhanced proton conductivity under wet conditions. For the purpose of describing the context of the present invention, it is noted that the general configuration and operation of fuel cells and fuel cell stacks is beyond the scope of the present invention. Rather, the present invention is directed to particular flowfield plate configurations and to general concepts regarding their design. Regarding the general configuration and operation of fuel cells and fuel cell stacks, applicants refer to the vast collection of teachings covering the manner in which fuel cell "stacks" and the various components of the stack are configured. For example, a plurality of U.S. patents and published applications relate directly to fuel cell configurations and corresponding methods of operation. More specifically, FIGS. 1 and 2 of U.S. Patent Application Pub. No. 2005/0058864, and the accompanying text, present a detailed illustration of the components of a fuel cell stack—this particular subject matter is expressly incorporated herein by reference.

BRIEF SUMMARY OF THE INVENTION

The present invention is directed to mitigating overuse of limited membrane regions in electrochemical conversion assemblies, particularly under cold start conditions. In accordance with one embodiment of the present invention, an electrochemical conversion assembly is provided comprising at least one electrochemical conversion cell configured to convert first and second reactants to electrical energy. The cell comprises a membrane electrode assembly, an anode flowfield portion and a cathode flowfield portion defined on opposite sides of the membrane electrode assembly. A first reactant supply is configured to provide a first reactant to an anode side of the membrane electrode assembly via the anode flowfield portion and a second reactant supply is configured to provide a second reactant to a cathode side of the membrane electrode assembly via the cathode flowfield portion. At least one of the anode and cathode flowfield portions comprises an enhanced flowfield plate defining an active region, a fluid header region, and a feed region.

The active region comprises a plurality of fluid flow channels and the feed region is configured to transfer fluid from the header region to the fluid flow channels of the active region. The fluid header region defines an anode fluid header, a cathode fluid header, and a coolant fluid header fluidly decoupled from each other. A portion of the feed region interfaces with the active region along a feed/active interface extending across a substantial entirety of the active region. A portion of the fluid header region corresponding to at least one of the fluid headers interfaces with the feed region along a header/feed interface oriented at an acute angle with respect to the feed/active interface. The feed region defines an array of substantially linear fluid channels extending from the header/feed interface to the feed/active interface.

In accordance with another embodiment of the present invention, an electrochemical conversion assembly is provided comprising an enhanced anode flowfield plate and an enhanced cathode flowfield plate positioned on opposite sides of a membrane electrode assembly.

Accordingly, it is an object of the present invention to mitigate overuse of limited membrane regions in electrochemical conversion assemblies. Of course, other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
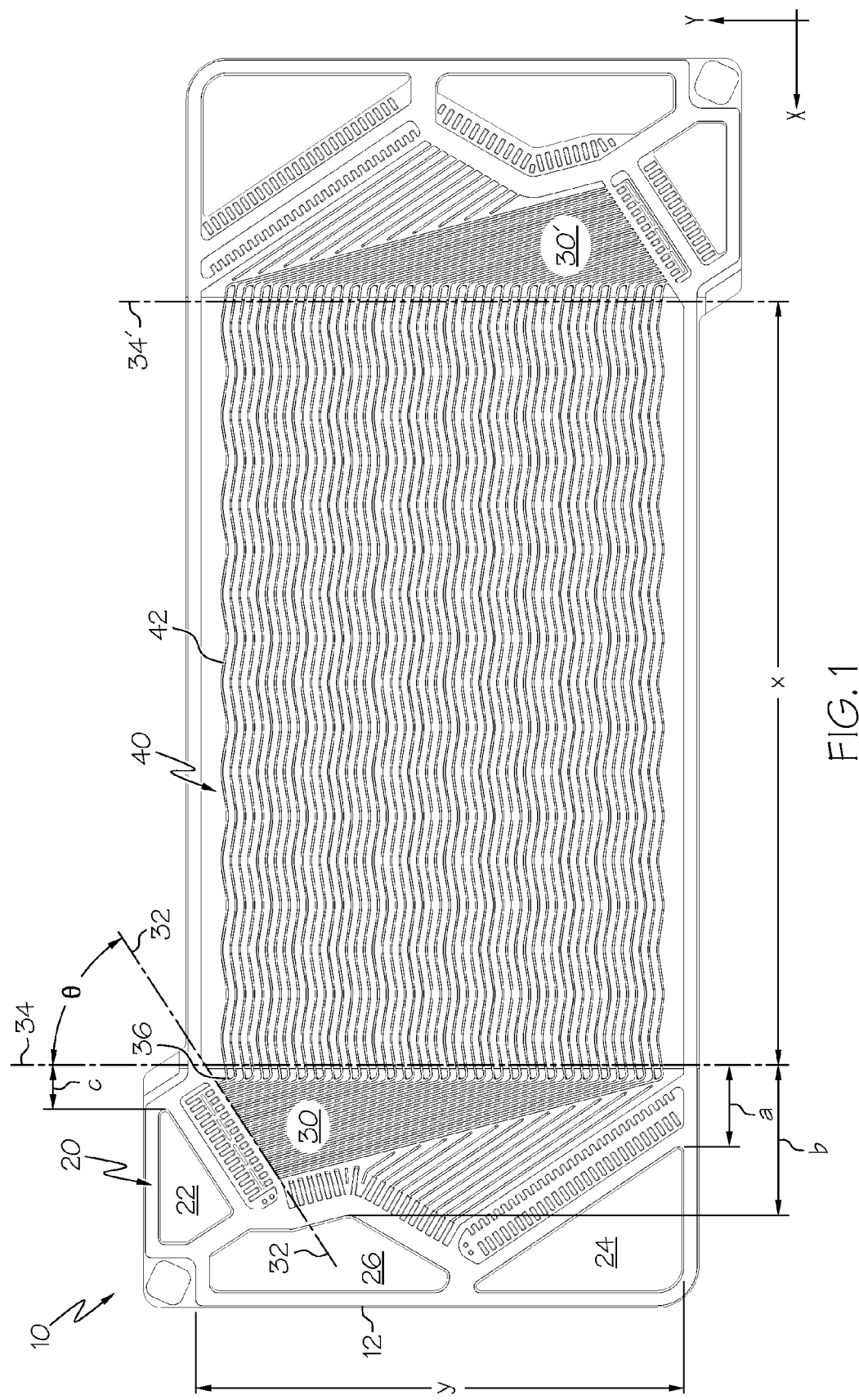
FIG. 1 is a plan view of the reactant side of an anode flowfield plate according to one embodiment of the present invention.

An enhanced anode flowfield plate 10 according to one embodiment of the present invention is illustrated in FIG. 1 and comprises a fluid header region 20, a feed region 30, and an active region 40. The active region 40 comprises a plurality of fluid flow channels 42. The feed region 30 is configured to transfer fluid from the header region 20 to the fluid flow channels 42 of the active region 40. The active region 40 extends along two dimensions x,y defined within the X-Y plane of the enhanced flowfield plate 10. As will be appreciated by those familiar with fuel cell design, the extent of the x,y dimensions of the active region 40 corresponds directly to the size of the associated membrane electrode assembly, which assemblies typically approximate a substantially orthogonal quadrilateral.

The fluid header region 20 defines an anode fluid header 22, a cathode fluid header 24, and a coolant fluid header 26 fluidly decoupled from each other. In the illustrated embodiment, the anode fluid header 22 interfaces with the feed region 30 along a header/feed interface 32 oriented at an acute angle θ with respect to the feed/active interface 34 where the feed region 30 interfaces with the active region 40. The feed/active interface 34 extends across the substantial entirety of the active region 40. In addition, the feed region 30 defines an array of substantially linear fluid channels 36 extending from the header/feed interface 32 to the feed/active interface 34. In this manner, the enhanced flowfield plate 10 illustrated in FIG. 1 can be utilized to minimize the extent to which the initial heat generated from current distribution during start-up is localized in specific areas of the active region 40 of the flowfield plate 10 and portions of the membrane electrode assembly lying in register with the plate 10.

More specifically, the present inventors have recognized that initial current density, and therefore initial heat generation, is concentrated near the anode inlet area of a fuel cell because it is the first to see reactants when a cold start is initiated. As more current load is applied to the fuel cell stack, more current gets generated near the fuel cell stack header anode inlet and it continues to warm in a relatively concentrated area. The heat generated in the relatively concentrated area is gradually dispersed to more of the active region of the cell, melting any ice present and rendering more catalyst sites active until the active region is up to normal operating temperature. The limited, high temperature/high current density region that appears near the anode inlet during cold starting is undesirable because the region would become relatively over utilized over many repeated cold start cycles and would negatively impact the durability of the membrane electrode assembly in the over utilized regions. To exacerbate the problem, pre-freeze purge operations in fuel cells often make the anode inlet area one of driest areas of the cell when a cold start is initiated. The enhanced flowfield plate design of the present invention is proposed herein as a means for increasing the utilization of more of the active region during start-up by distributing more of the anode reactants to more of the active region at start-up. In effect, although other objects of the present invention can be gleaned from the present description, particular embodiments of the present invention seek to distribute the high temperature/high current density region over more of the active region of the cell.

Figure 2:
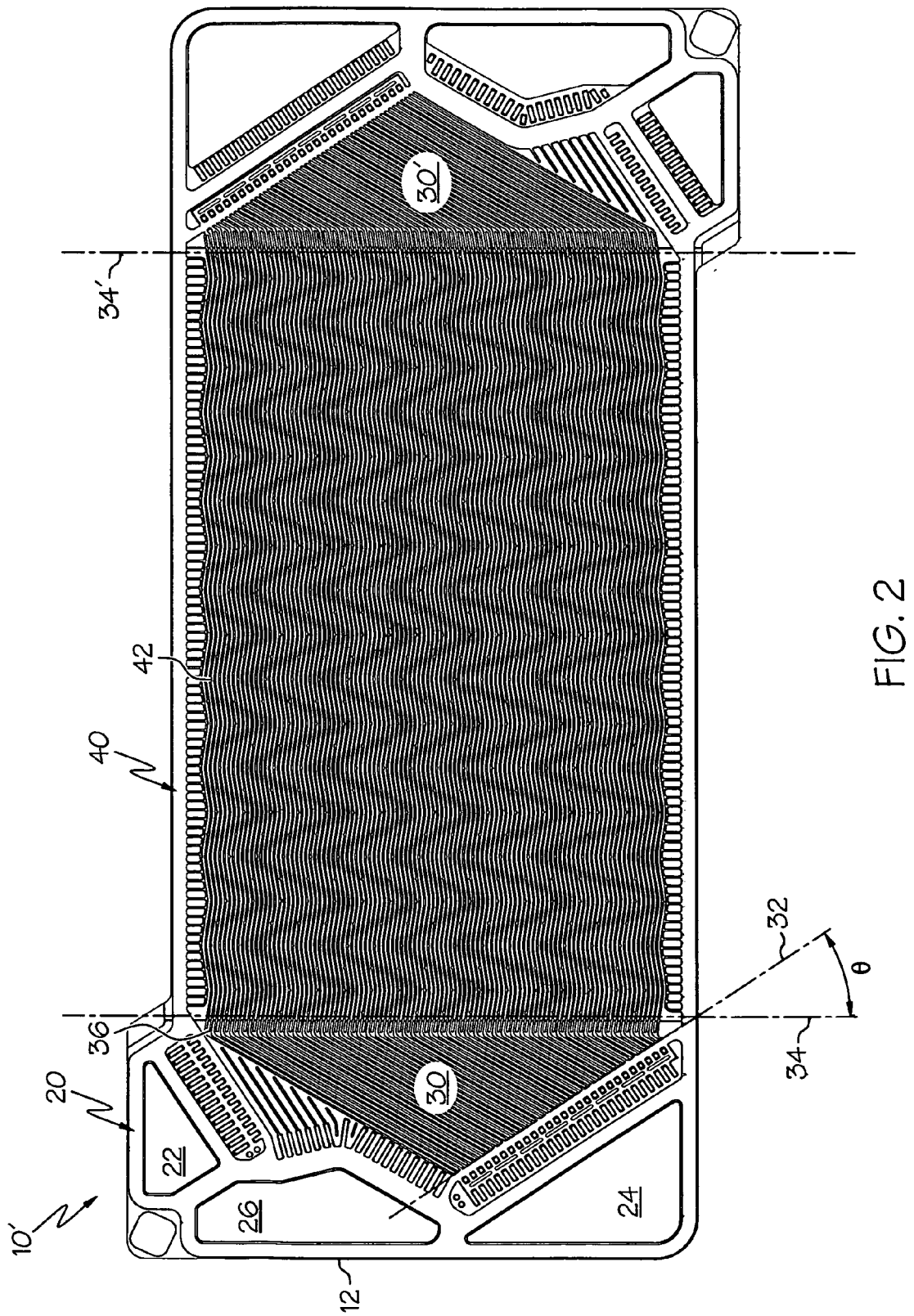
FIG. 2 is a mirror image plan view of the reactant side of a cathode flowfield plate configured to complement the embodiment of the present invention illustrated in FIG. 1.

Referring to FIG. 2, an enhanced cathode flowfield plate 10' is illustrated, where like structure is indicated with like reference numerals in FIGS. 1 and 2. In the embodiment illustrated in FIG. 2, the cathode fluid header 24 interfaces with the feed region 30 along the header/feed interface 32 and the feed region 30 interfaces with the active region 40 along the feed/active interface 34. As is the case with the anode flowfield plate of FIG. 1, the feed/active interface 34 extends across the substantial entirety of the active region 40. Comparing FIGS. 1 and 2, it is noted that the respective header/feed interfaces 32 of the respective enhanced flowfield plates associated with the anode and cathode flowfield plates 10, 10' of FIGS. 1 and 2 face the respective feed/active interfaces 34 from opposite directions.

Referring to the header regions 20 illustrated in FIGS. 1 and 2, it is noted that the anode fluid header 22, the cathode fluid header 24, and the coolant fluid header 26 each extend a given distance from a common edge 12 of the respective enhanced flowfield plates 10, 10' in the direction of the active region 40. The spacing between the active region 40 and the fluid header region 20 varies from a minimum value c in an area of the anode fluid header 22 or a minimum value a in an area of the cathode fluid header 24 to a maximum value b in an area of the coolant fluid header 26. In this manner, the feed region 30 can be configured such that the array of substantially linear fluid channels 36 defines a substantially triangular configuration where the longest side of the triangular configuration is defined at the feed/active interface 34 and the shortest side of the triangular configuration is defined at the header/feed interface 32.

Regarding the active regions 40 illustrated in FIGS. 1 and 2, it is noted that the fluid flow path defined by the fluid flow channels 42 in the active region maintains a continuous progression away from the feed/active interface. More specifically, the continuous progression of fluid flow is characterized by changes in flow direction of substantially less than 90 degrees. In this manner, fluid within the fluid flow channels 42 is less likely to become trapped therein because it can be readily drained from the active region 40.

The fluid flow channels 42 in the active region 40 define respective fluid inlets along the feed/active interface 34 and respective fluid outlets along an opposite feed/active interface 34' defined at a distal edge of the fluid flow channels 42. An opposite feed region 30' interfaces with the fluid outlets and communicates with an opposite header region 20', also defined beyond the distal edge of the fluid flow channels in the active region 40.

Further, it is noted that the active region 40 is configured to be rotationally symmetric in a plane defined by a major face of the enhanced flowfield plate 10, 10'. The inlet and outlet sides of each plate 10, 10' can be interchanged by merely rotating the plate 180° in the plane of the plate. In this manner, the enhanced flowfield plate 10, 10' is configured such that the header and feed regions 20, 30 are functionally interchangeable with the opposite header and feed regions 20', 30'.

For the purposes of describing and defining the present invention it is noted that an acute angle is an angle of greater than zero and less than 90 degrees. Further, the term "linear" is utilized herein to correspond to a unidirectional projection, as opposed to a curved path or a path defined by a plurality of linear segments extending in different directions.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue. For example, in the context of the "substantially linear fluid channels" identified herein, it is noted that the insignificant introduction of curved or otherwise non-linear portions in the linear channels illustrated herein should not be taken as a departure from the scope of the terms "substantially linear" absent a showing that the non-linear portions result in a change in the basic function of the "substantially linear fluid channels."

Having described the invention in detail and by reference to specific embodiments thereof, it will be apparent that modifications and variations are possible without departing from the scope of the invention defined in the appended claims. For example, it is contemplated that a vehicle may be configured to incorporate an electrochemical conversion assembly according to the present invention to permit the electrochemical conversion assembly to serve as a source of motive power for the vehicle.

Although some aspects of the present invention are identified herein as preferred or particularly advantageous, it is contemplated that the present invention is not necessarily limited to these preferred aspects of the invention.

The invention claimed is:

1. An electrochemical conversion assembly comprising at least one electrochemical conversion cell configured to convert first and second reactants to electrical energy, said electrochemical conversion cell comprising a membrane electrode assembly, an anode flowfield portion and a cathode flowfield portion defined on opposite sides of said membrane electrode assembly, a first reactant supply configured to provide a first reactant to an anode side of said membrane electrode assembly via said anode flowfield portion, and a second reactant supply configured to provide a second reactant to a cathode side of said membrane electrode assembly via said cathode flowfield portion, wherein:

at least one of said anode and cathode flowfield portions comprises an enhanced flowfield plate defining an active region, a fluid header region, and a feed region;

said active region comprises a plurality of fluid flow channels and said feed region is configured to transfer fluid from said header region to said fluid flow channels of said active region;

a portion of said feed region interfaces with said active region along a feed/active interface extending across a substantial entirety of said active region;

said fluid header region defines an anode fluid header, a cathode fluid header, and a coolant fluid header fluidly decoupled from each other, wherein said fluid header region is disposed on one side of the feed/active interface;

a portion of said fluid header region corresponding to at least one of said fluid headers interfaces with said feed region along a header/feed interface oriented at an acute angle with respect to said feed/active interface; and said feed region defines an array of substantially linear fluid channels extending from said header/feed interface to said feed/active interface;

wherein the coolant fluid header at its closest point to the feed/active interface is spaced a greater distance from the feed/active interface than the anode fluid header at its closest point to the feed/active interface or the cathode fluid header at its closest point to the feed/active interface.

2. An electrochemical conversion assembly as claimed in claim 1 wherein said feed region is configured such that said feed/active interface minimizes the extent of localization of initial heat generated from current distribution during start-up of said electrochemical conversion assembly.

3. An electrochemical conversion assembly as claimed in claim 1 wherein said feed region is configured such that said array of substantially linear fluid channels define a substantially triangular configuration.

4. An electrochemical conversion assembly as claimed in claim 3 wherein a longest side of said triangular configuration is defined at said feed/active interface.

5. An electrochemical conversion assembly as claimed in claim 3 wherein a shortest side of said triangular configuration is defined at said header/feed interface.

6. An electrochemical conversion assembly as claimed in claim 1 wherein:

said active region extends along two dimensions defined within a plane of said enhanced flowfield plate; and the extent to which said active region extends along said two dimensions is defined by the extent of said membrane electrode assembly.

7. An electrochemical conversion assembly as claimed in claim 6 wherein said respective extents of said active region and said membrane electrode assembly approximate a substantially orthogonal quadrilateral.

8. An electrochemical conversion assembly as claimed in claim 1 wherein a fluid flow path defined by said fluid flow channels in said active region maintains a continuous progression away from said feed/active interface.

9. An electrochemical conversion assembly as claimed in claim 8 wherein said continuous progression of said fluid flow is characterized by changes in flow direction of substantially less than 90 degrees.

10. An electrochemical conversion assembly as claimed in claim 1 wherein said active region is configured to be rotationally symmetric in a plane defined by a major face of said enhanced flowfield plate.

11. An electrochemical conversion assembly as claimed in claim 1 wherein each of said anode and cathode flowfield portions comprises an enhanced flowfield plate as defined in claim 1 such that:

said anode fluid header of said enhanced flowfield plate associated with said anode flowfield portion interfaces with said feed region along said header/feed interface; and said cathode fluid header of said enhanced flowfield plate associated with said cathode flowfield portion interfaces with said feed region along said header/feed interface.

12. An electrochemical conversion assembly as claimed in claim 11 wherein said respective header/feed interfaces of said respective enhanced flowfield plates associated with said anode and cathode flowfield portions face said feed/active interface from opposite directions.

13. An electrochemical conversion assembly as claimed in claim 1 wherein:

said fluid flow channels in said active region define respective fluid inlets along said feed/active interface and respective fluid outlets along an opposite feed/active interface where an opposite feed region interfaces with said fluid outlets and communicates with an opposite header region of said enhanced flowfield plate; and said enhanced flowfield plate is configured such that said header region and said feed region are functionally interchangeable with said opposite header region and said opposite feed region through rotation of said enhanced flowfield plate in a plane defined by said active region.

14. An electrochemical conversion assembly as claimed in claim 1 wherein:

said fluid flow channels in said active region define respective fluid inlets along said feed/active interface and respective fluid outlets along an opposite feed/active interface where an opposite feed region interfaces with said fluid outlets and communicates with an opposite header region of said enhanced flowfield plate; and said enhanced flowfield plate is configured to be rotationally symmetric in a plane defined by a major face of said enhanced flowfield plate.

15. An electrochemical conversion assembly as claimed in claim 1 wherein:
- said fluid flow channels in said active region define respective fluid inlets along said feed/active interface and respective fluid outlets along an opposite feed/active interface where an opposite feed region interfaces with said fluid outlets and communicates with an opposite header region of said enhanced flowfield plate;
- a portion of said opposite feed region interfaces with said active region along said opposite feed/active interface extending across a substantial entirety of said active region;
- a portion of said opposite fluid header region interfaces with said opposite feed region along an opposite header/feed interface oriented at an acute angle with respect to said opposite feed/active interface; and
- said opposite feed region defines an array of substantially linear fluid channels extending from said opposite header/feed interface to said opposite feed/active interface.

16. A vehicle comprising said electrochemical conversion assembly as claimed in claim 1, wherein said electrochemical conversion assembly serves as a source of motive power for said vehicle.

17. An electrochemical conversion assembly comprising at least one electrochemical conversion cell configured to convert first and second reactants to electrical energy, said electrochemical conversion cell comprising a membrane electrode assembly, an anode flowfield portion and a cathode flowfield portion defined on opposite sides of said membrane electrode assembly, a first reactant supply configured to provide a first reactant to an anode side of said membrane electrode assembly via said anode flowfield portion, and a second reactant supply configured to provide a second reactant to a cathode side of said membrane electrode assembly via said cathode flowfield portion, wherein:
- said anode flowfield portion comprises an enhanced flowfield plate defining an active region, a fluid header region, and a feed region;
- said active region of said anode flowfield portion comprises a plurality of fluid flow channels and said feed region of said anode flowfield portion is configured to transfer fluid from said header region of said anode flowfield portion to said fluid flow channels of said active region of said anode flowfield portion;
- a portion of said feed region of said anode flowfield portion interfaces with said active region of said anode flowfield portion along a feed/active interface of said anode flowfield portion extending across a substantial entirety of said active region of said anode flowfield portion;
- said fluid header region of said anode flowfield portion defines an anode fluid header, a cathode fluid header, and a coolant fluid header fluidly decoupled from each other, wherein said fluid header region is disposed on one side of the feed/active interface;
- a portion of said fluid header region of said anode flowfield portion corresponding to said anode fluid header interfaces with said feed region of said anode flowfield portion along a header/feed interface of said anode flowfield portion oriented at an acute angle with respect to said feed/active interface of said anode flowfield portion;
- said feed region of said anode flowfield portion defines an array of substantially linear fluid channels extending from said header/feed interface of said anode flowfield portion to said feed/active interface of said anode flowfield portion;
- said cathode flowfield portion comprises an enhanced flowfield plate defining an active region, a fluid header region, and a feed region;
- said active region of said cathode flowfield portion comprises a plurality of fluid flow channels and said feed region of said cathode flowfield portion is configured to transfer fluid from said header region of said cathode flowfield portion to said fluid flow channels of said active region of said cathode flowfield portion;
- said fluid header region of said cathode flowfield portion defines an anode fluid header, a cathode fluid header, and a coolant fluid header fluidly decoupled from each other;
- a portion of said feed region of said cathode flowfield portion interfaces with said active region of said cathode flowfield portion along a feed/active interface of said cathode flowfield portion extending across a substantial entirety of said active region of said cathode flowfield portion;
- a portion of said fluid header region of said cathode flowfield portion corresponding to said cathode fluid header interfaces with said feed region of said cathode flowfield portion along a header/feed interface of said cathode flowfield portion oriented at an acute angle with respect to said feed/active interface of said cathode flowfield portion; and
- said feed region of said cathode flowfield portion defines an array of substantially linear fluid channels extending from said header/feed interface of said cathode flowfield portion to said feed/active interface of said cathode flowfield portion;
- wherein the coolant fluid header at its closest point to the feed/active interface is spaced a greater distance from the feed/active interface than the anode fluid header at its closest point to the feed/active interface or the cathode fluid header at its closest point to the feed/active interface.

18. An electrochemical conversion assembly as claimed in claim 17 wherein said respective header/feed interfaces of said respective enhanced flowfield plates associated with said anode and cathode flowfield portions face said feed/active interface from opposite directions.

* * * * *